UNITED STATES PATENT OFFICE.

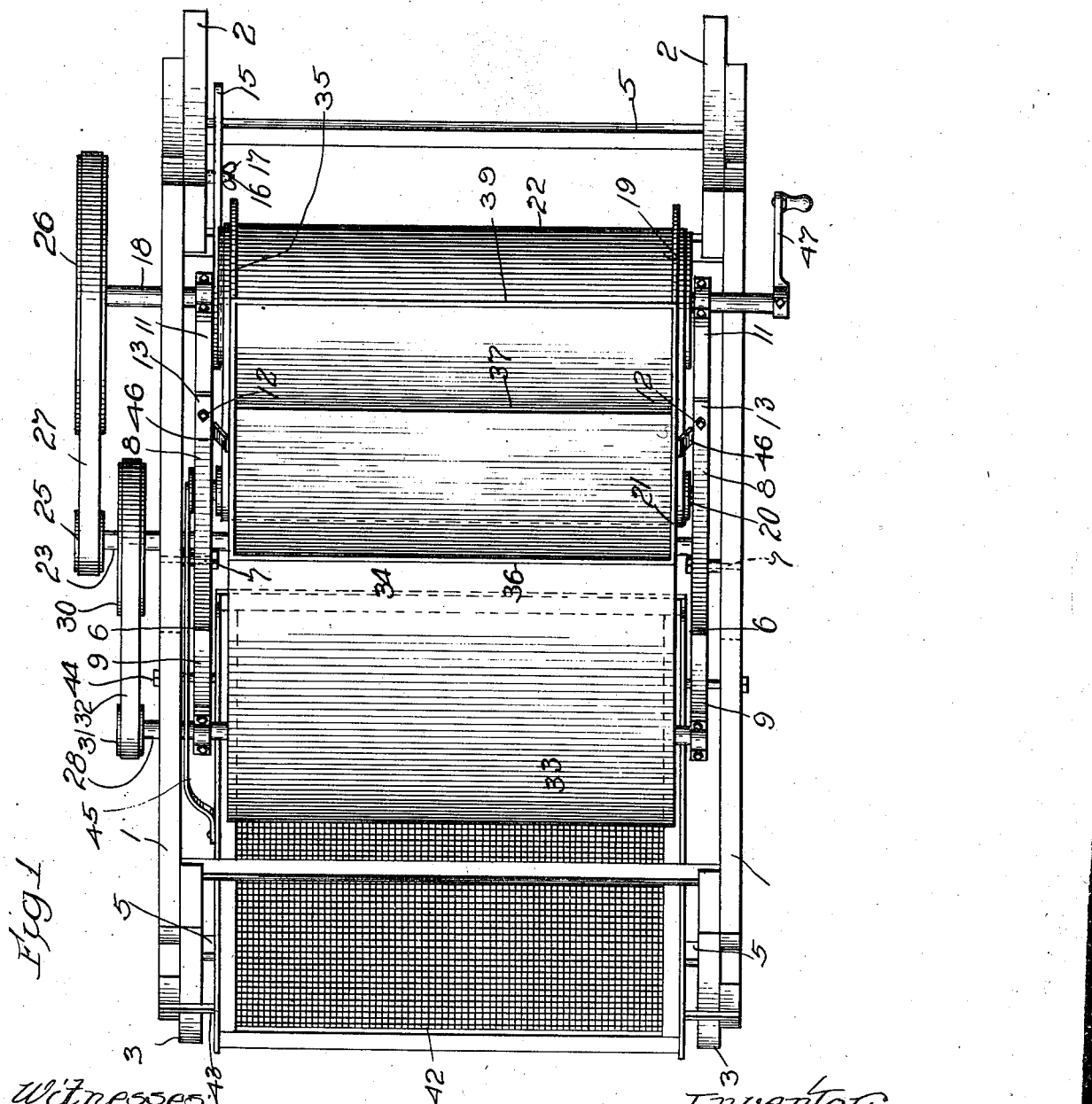

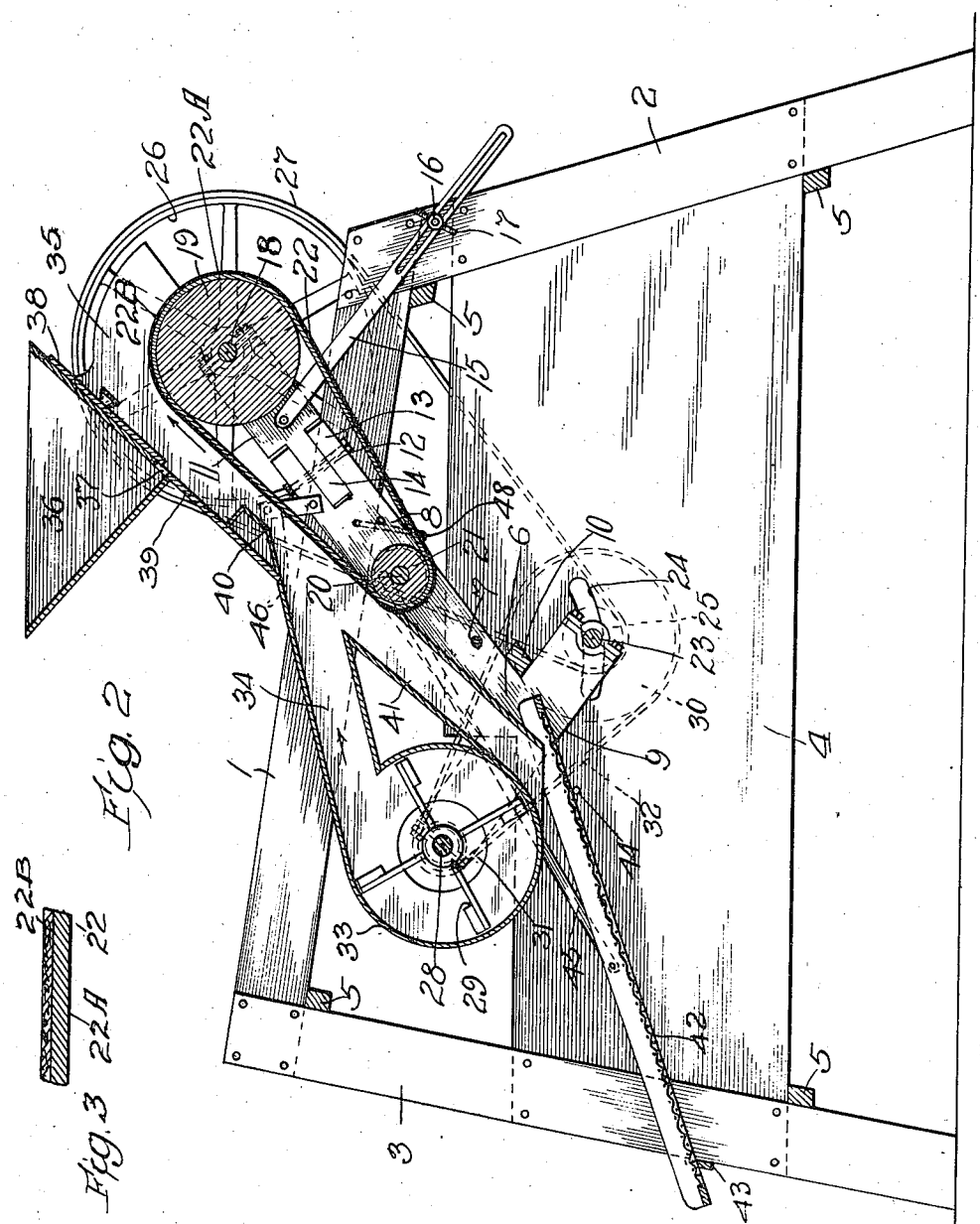

JOHN JACOBS, OF CASS COUNTY, NORTH DAKOTA.

GRAIN-SEPARATOR.

965,190.  Specification of Letters Patent.  Patented July 26, 1910.

Application filed May 7, 1909. Serial No. 494,528.

*To all whom it may concern:*

Be it known that I, JOHN JACOBS, a citizen of the United States of America, and a resident of Cass county, North Dakota, have invented certain new and useful Improvements in Grain-Separators, of which the following is a specification.

The main objects of this invention are to provide an improved construction for grain separators in which the separating or cleaning mechanism is adapted to be quickly adjusted with reference to the weight of the grain and to its flow therethrough; to provide improved mechanism for supporting and adjusting the separating or cleaning mechanism; to provide improved means for retarding or impeding the flow of the grain in the wind blast to permit the lighter foul stuff to be thoroughly removed by the wind blast while the grain is traveling against the blast; and to provide a separator specially adapted for use in separating wild oats and other foul stuff from cultivated oats.

A specific construction embodying this invention is illustrated in the accompanying drawings, in which:

Figure 1 is a plan view of a grain separator embodying this invention. Fig. 2 is a longitudinal section of the same taken intermediate the tilting members, and showing parts in elevation. Fig. 3 is a sectional detail of the conveyer belt.

In the construction shown in the drawings, the main frame 1, which is adapted to support the operating mechanism, comprises front and rear legs or posts 2 and 3, which are connected together longitudinally of the machine by means of side members 4, and transversely by means of cross-bars or stays 5.

Pivotally supported within the main frame, and adapted to be adjusted about a horizontal axis, is the tilting frame for the cleaning mechanism. Said tilting frame preferably comprises two approximately T-shaped members 6 which are pivoted on the inner sides of the side members 4 on the shaft 7, with their long arms 8 extending upwardly and forwardly and their cross arms 9 located beneath and to the rear of said shaft. Said tilting members are rigidly secured together by means of a cross-bar 10 which holds them in unvarying relation to each other, and each long arm 8 is provided with an extensible section 11 which telescopes therewith and is adapted to be held in adjusted position by means of a bolt or pin 12 passing transversely through the telescoping parts 13 and 14. Said tilting frame is adapted to be tilted on the shaft 7 to vary its inclination to the horizontal, and is held in adjusted position by means of adjusting bars 15 which are pivoted at their upper ends to the arms 8 and which are slotted or otherwise formed at their lower ends to receive bolts 16 carried on the front legs 2 and provided with wing nuts 17 adapted to bind the bars 15. Journaled in the forward ends of said sections 11 in the drive shaft 18, on which is a relatively large belt pulley 19, and journaled in the arms 8 at the rear of said shaft 18 is a shaft 20 on which is a smaller belt pulley 21. Said belt pulleys extend approximately the full width of the tilting frame, and an endless retarding belt or member 22 is carried thereon and is of a width to fill practically all of the space between the tilting members 6. The upper lap of said retarding belt is adapted to travel forwardly at an upward inclination, as indicated by the arrow in Fig. 2. This belt preferably consists of a supporting layer 22$^A$, of canvas, having on its outer face a layer 22$^B$ of soft, woolly cloth, such as canton flannel, to which wild oats will readily adhere.

A transmission shaft 23 is journaled in the lower ends of the cross arms 9 and projects through a slot or aperture 24 in one side 4 of the main frame. Said shaft 23 is provided on its end beyond said side member 4 with a belt pulley 25 which is in alinement with a larger belt pulley 26 on the drive shaft, and a belt 27 is carried on said pulleys 25 and 26. In the upper ends of said cross arms 9 is journaled a fan shaft 28 on which is carried a fan 29. Pulleys 30 and 31 are secured in alinement on said shafts 23 and 28 respectively, and a belt 32 is carried thereon and acts to drive the fan. A fan casing 33 is supported on the shaft 28 and incloses said fan. Said fan and casing extend approximately the full width between the tilting members 6, and the casing is preferably open at its ends for the admission of wind. Leading forwardly and opening from the upper portion of said fan casing is the wind chute 34 which opens at its forward end above the lower rear end of the belt 22 and is adapted to direct the blast of wind from the fan onto said belt at a slight inclination thereto and in the direction of the travel of the upper lap of the belt. Said casing and wind chute are preferably formed of sheet metal, and extending forwardly from the sides of said chute and integral therewith are the side retaining walls 35 which lie in close contact at their lower edges to the upper lap of the retarding belt and prevent the grain or other material from falling from the sides of the belt. These also act to confine the wind to the belt. A V-shaped hopper 36 is supported on said retaining walls 35, and is provided with an outlet opening 37 in the lower edge of its front wall, which extends the full length of the hopper and opens near the forward end of the upper lap of the retarding belt. Said hopper is adapted to deliver material to be cleaned to the belt, and the opening 37 is controlled by a slide gate 38 in the usual manner. The slide gate is slidably mounted on the front wall 39 of the hopper, and said front wall extends downwardly and rearwardly to the forward end of the wind chute to direct the wind along the retarding belt.

For the purpose of confining the wind pressure against the belt 22 at a point rearwardly of where the grain from the hopper strikes the belt, a deflector 40 is secured at the forward end of the wind chute and extends into the channel above the conveyer at a point rearwardly of the outlet 37 of the hopper. As the wind emerges from beneath said deflector, it is deflected upwardly by its contact with the belt at the point where the stream of grain is coming from the hopper, and acts to carry the lighter material, such as chaff, straw, and foul stuff lighter than the grain, out of the forward end of the machine.

Extending rearwardly and downwardly from the rear end of the retarding belt is the grain chute 41, which is supported on the lower side of the fan casing and wind chute and opens at its rear end above a reciprocating screen 42. Said screen is slidably mounted at an incline on cross-bars 43 and 44 carried on the main frame 1. Said screen may be reciprocated in any preferred manner, but, as shown, a pitman 45 is pivoted at one end to the screen and at the other end is pivoted on the pulley 21 eccentrically to the shaft 20.

For the purpose of supporting the forward ends of the retaining walls and the hopper, an arm 46 is secured on each tilting member 6 and to said retaining walls.

The machine may be operated by any preferred means, but, as shown, the drive shaft 18 is provided with a hand crank 47.

A wire 48 extending across the lower face of the lower lap of the belt 22 serves to scrape off any wild oats which still adhere to the belt.

The operation of the device shown is as follows: The tilting frame is adjusted by means of the bar 15 to set the upper lap of the retarding belt at such angle that the sound grain will flow rearwardly thereon against the movement of the belt and the air current, while the lighter foul stuff will be blown forwardly without carrying over the heavier grain. The grain and foul stuff leave the hopper in a thin stream extending transversely of the retarding belt, and the wind blast passing through the same carries off the lighter foul stuff. The grain, which is regular in shape, rolls down the belt and passes through the grain chute to the screen 41, where the shrunken grain and foul stuff, such as cockle and other seeds, which are regular in shape but too heavy to be carried off by the wind, are screened out and drop beneath the screen, while the clean grain is discharged from the rear of the screen. Any foul stuff, which is too irregular in shape to roll down the belt and too heavy to be carried over by the wind, such as sticks or stones, is carried forwardly by the belt and discharged at the front of the machine. The wild oats adhere to the woolly surface of the belt and are thus also discharged. Those that do not fall off from the belt in passing over the pulley 19 are discharged by the scraper wire 48.

The retarding belt may be tightened by adjusting the extensible sections 11 of the arms 8, and the flow of grain from the hopper is regulated by the gate 38, while the force of the wind blast is regulated by the speed of the fan.

Although but one specific embodiment of this invention has been herein shown, it will be understood that numerous details of the construction shown may be altered or omitted without departing from the spirit of this invention.

I claim:

1. A grain separator, comprising a frame pivotally supported intermediate its ends, means adapted to support said frame at various angles, a fan carried on the rear end of said frame, a hopper on the forward end of the frame, a wind chute extending forwardly from said fan, an endless retarding belt extending forwardly from beneath the forward end of said chute, and a grain chute extending rearwardly from said belt.

2. A grain separator, comprising a main frame, a longitudinally extensible tilting frame pivoted thereon, an adjusting bar pivotally connected to said tilting frame and adjustably secured to the main frame, a fan casing supported on said tilting frame, a fan thereon, means for operating said fan, a wind chute extending forwardly and upwardly from said casing, a deflector at the mouth of said chute, a hopper carried on the tilting frame forwardly of said chute, an endless belt supported beneath said hopper and adapted to receive grain therefrom, means adapted to move the upper lap of said belt in the opposite direction from the flow of said grain, and a grain chute leading downwardly and rearwardly from said belt.

Signed at Enderlin, this 3d day of May 1909.

JOHN JACOBS.

Witnesses:
 GEO. S. MATTESON,
 PAUL LINDEMANN.